United States Patent Office 3,312,709
Patented Apr. 4, 1967

3,312,709
PARA-(LOWER)ALKOXYBENZOYLSCOPOLAMINE
Francis S. Kilmer MacMillan, Cincinnati, Ohio, assignor to The Procter & Gamble Company, Cincinnati, Ohio, a corporation of Ohio
No Drawing. Filed June 29, 1964, Ser. No. 379,023
2 Claims. (Cl. 260—292)

This invention relates to new compounds having anticholinergic properties. More particularly this invention relates to novel esters of scopolamine.

Anticholinergic compounds such as atropine and scopolamine have been used in the treatment of certain pathological cases of excessive perspiration. The eccrine sweat glands, which secrete most of the liquid sweat, are activated by a chemical "mediator" which is liberated at nerve endings when they are properly stimulated. This "mediator" is thought to be acetylcholine, and anticholinergic compounds reduce perspiration by interfering with the action of acetylcholine, probably by blocking the receptor sites of the secretory cells of the sweat glands.

Although the potential utility of anticholinergic compounds in cosmetic antiperspirant formulations has long been recognized, such utilization has been retarded because the classic anticholinergics do not provide adequate inhibition of perspiration at a level of usage which is physiologically safe. Only recently have safe and effective antiperspirant formulations based on anticholinergic compounds become available. These formulations, disclosed in British Patent 940,279, published October 30, 1963, contain certain anticholinergic scopolamine esters as active ingredients.

Although the antiperspirant formulations of the British patent are highly effective, the anticholinergic compounds employed therein can hydrolyze and the formulations thereby lose activity over protracted periods of time. Investigators, therefore, continue to search for more stable and effective anticholinergic compounds.

It is an object of this invention to provide new compounds having improved anticholinergic properties.

The free base form of the compounds of this invention have the following structural formula:

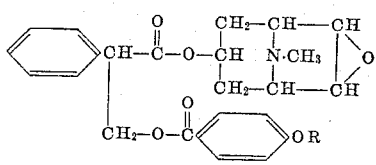

wherein R is an alkyl radical having not more than about 5 carbon atoms. The preferred acid forming anions which yield the acid salt form of the compound of this invention are chloride, bromide, and iodide. Other anions which yield acid salts encompassed by this invention are nitrate, citrate, acetate, methosulfate, sulfate, phosphate, tartrate, lactate and benzoate.

Example I

Para-methoxybenzoyl scopolamine hydrobromide was prepared in the following manner:

(a) To a suspension of 64.0 grams (0.17 mole) of anhydrous scopolamine hydrobromide in 166 ml. of dry pyridine was added 42.6 grams (0.25 mole) of para-methoxybenzoyl chloride (anisoyl chloride). The mixture became warm and the solid dissolved giving a red solution. After standing at room temperature for five days, the solvent was removed by distillation under reduced pressure and at a temperature below 40° C. The residue was washed with ice-water and 500 ml. of a 10% aqueous sodium carbonate solution. The wash solution was decanted and the residue was extracted twice with ether. The aqueous solution was then made strongly basic with a sodium hydroxide solution and again extracted with ether. The combined ether extracts were washed with water and a saturated sodium chloride solution and then dried over anhydrous sodium sulfate. Evaporation of the ether left 94.3 grams of crude free base (para-methoxybenzoyl scopolamine) as a brown oil which was soluble in ethanol.

(b) An ethanolic solution of 94.3 grams of this base was acidified with hydrogen bromide gas. The solution was diluted with ether and the crude para-methoxybenzoyl scopolamine hydrobromide separated as a white-yellow solid; this was recrystallized from water giving 77.5 grams (90.2% over-all yield) of white crystals, having a melting point of 198–199° C.

Analysis.—Calcd. for $C_{25}H_{28}BrNO_6$: C, 57.92; H, 5.44; Br, 15.42; N, 2.70. Found: C, 57.80; H, 5.90; Br, 15.7; N, 2.70.

Further confirmation of the structure of this ester was obtained from the infrared spectrum and nuclear magnetic resonance spectrum.

In like manner, corresponding acid salts can be prepared by acidifying the base derived from (a) above with other acids such as, for example, HCl, HI, $HNO_3$, $H_3PO_4$, $H_2SO_4$, $CH_3COOH$, $CH_3CH_2COOH$, $HOOC(CHOH)_2COOH$, $CH_3CHOHCOOH$, $C_6H_5COOH$, 2-hydroxy-1,2,3-propane-tricarboxylic acid, or dihydroxy-succinic acid, in place of HBr in step (b).

Para-ethoxybenzoyl scopolamine is prepared by substituting 0.25 mole of para-ethoxybenzoyl chloride for para-methoxybenzoyl chloride in step (a). Similarly, para-propoxybenzoyl scopolamine is prepared by substituting .25 mole of para-n-propoxybenzoyl chloride for para-methoxybenzoyl chloride in step (a). para-isopropoxybenzoyl chloride, para-n-butoxy-benzoyl chloride, or para-pentoxybenzoyl chloride in a quantity of 0.25 mole can be used in place of para-methoxybenzoyl chloride to yield the corresponding esters of scopolamine.

Surprisingly the para-(lower) alkoxy substituent renders the benzoyl ester of scopolamine more stable to hydrolysis and improves antiperspirant efficacy. Thus, para-methoxybenzoyl scopolamine and acid salts thereof, for example, are substantially more stable and effective than benzoyl scopolamine as can be seen from the following test.

Aqueous solutions containing 0.25% of para-methoxybenzoyl scopolamine·HBr were adjusted to varying pH's with HCl or NaOH and stored at 90° C. for varying intervals of time. Thereafter these solutions were analyzed to determine the percent of hydrolysis at each interval. The results are set forth in Table 1 below.

TABLE 1

| Compound | Percent Hydrolysis at 90° C. | | | |
|---|---|---|---|---|
| | pH | 24 hours | 48 hours | 96 hours |
| I. Para-methoxybenzoyl scopolamine·HBr | 3.0 | 0.0 | 0.0 | 0.0 |
| | 5.0 | 8.2 | 14.6 | 18.2 |
| | 6.0 | 10.3 | 34.6 | 48.3 |
| | 6.5 | 22.8 | 35.5 | 44.6 |
| II. Benzoyl scopolamine·HBr | 3.0 | 0.0 | 0.0 | 0.0 |
| | 5.0 | 10.3 | 15.4 | 25.7 |
| | 6.0 | 16.3 | 41.9 | 62.5 |
| | 6.5 | 27.4 | 60.0 | 65.5 |

It can be seen that the para-methoxy substituted benzoyl ester is substantially more stable to hydrolysis than the unsubstituted benzoyl ester. Hydrolysis of the anticholinergic compound results in diminished antiperspirant activity. Thus, the above solutions containing benzoyl scopolamine·HBr would be expected to have less antiperspiratnt activity than those containing para-methoxybenzoyl scopolamine·HBr, after aging. To test this hypothesis, the above solutions were evaluated for antiperspirant activity after aging for 48 hours at 90° C. The aged solutions were diluted with water to provide a 0.025% solution (ignoring hydrolysis), and tested using the following method (hereinafter referred to as the "forearm method"):

A given area of the forearm of each test subject is treated three times with the composition to be tested, over a period of ten minutes, permitting the composition to dry each time. After 4 or 5 hours, the arm is washed with water and dried. A 1.5% solution of iodine in ethanol is then painted over the area and allowed to dry. A slurry of starch is placed over the area and the subject sits in a room at 100° F. for 5 to 15 minutes, depending on the subject. Any perspiration emitted releases iodine which reacts with the starch to give a visual indication (a blue-black color) of perspiration. The relative degree of perspiration inhibition is graded on a 0–4 scale, 0 indicating no antiperspirant effect, 4 indicating complete perspiration inhibition. A value of 3 on this scale represents about 80% inhibition, 2 about 60% and 1 about 30%. The results obtained with the respective aged solutions are set forth to Table 2 below:

TABLE 2

| Compound | Average Degree of Inhibition | |
|---|---|---|
| | pH | 24 hours (6 subjects) |
| I. Para-Methoxybenzoyl scopolamine·HBr | 3.0 | 3.8 |
| | 5.0 | 3.4 |
| | 6.0 | 2.8 |
| | 6.5 | 2.6 |
| II. Benzoyl scopolamine·HBr | 3.0 | 3.7 |
| | 5.0 | 3.3 |
| | 6.0 | 1.8 |
| | 6.5 | 0.4 |

As the pH of the aged solutions increases the antiperspirant activity of the solutions decrease with time reflecting greater hydrolytic stability for both compounds at lower pH. It is apparent, however, that the antiperspirant activity of the benzoyl scopolamine·HBr solutions diminishes more rapidly than the para-methoxybenzoyl scopolamine·HBr solutions.

The para-(lower)alkoxy benzoyl ester of scopolamine has a surprisingly high degree of antiperspirant activity, even greater than the $C_4$–$C_{12}$ scopolamine esters of British Patent 940,279, including the benzoyl ester. Extremely small amounts provide essentially complete inhibition of perspiration with no evidence of physiological side effects, e.g. dryness of mouth, toxicity or action on the central nervous system. Both the location and the nature of the benzoyl substituent appear to be critical to the attainment of improved stability and antiperspirant efficacy.

Because of the unique properties of the compounds of this invention, greatly improved antiperspirant compositions can be prepared. The antiperspirant compositions of this invention contain as an antiperspirant agent at least one compound selected from the group consisting of para-(lower)alkoxybenzoyl scopolamine and the acid salts thereof.

The antiperspirant agent can be employed in amounts not less than about 0.001% to provide antiperspirant efficacy and not more than about 0.25% to provide a margin of safety to ensure that there are no adverse physiological effects incident to repeated use of the composition. The preferred range is .005% to 0.05% (all parts and percentages herein are by weight).

The compositions of this invention should be formulated so that they have a pH in aqueous solution of not less than about 3.0 nor more than about 6.5. As shown supra, hydrolytic stability is greatest at lower pH's. However, irritation of the skin may be encountered at pH's lower than 3. At pH's above about 6.5 and especially at elevated temperatures, hydrolysis of the ester occurs at a rate such that a significant loss of antiperspirant activity will occur.

Preferably, the compositions of this invention are adjusted to pH 3–4 with a strong acid such as HCl, $HNO_3$, $H_2SO_4$ etc., and are essentially free of buffering materials other than the para-alkoxybenzoyl scopolamine salts. The compounds of this invention are best able to penetrate the skin and exert their antiperspirant effect at about pH 6.0. In the absence of buffering materials, the neutralizing potential of normal skin is sufficient to bring the pH of the composition near the optimum for skin penetration, soon after application. Because the concentration of anticholinergic agent employed in the compositions of this invention is so low, the buffering capacity of the para-alkoxybenzoyl scopolamine salts is not sufficient to prevent a pH rise to about 6.0 when the compositions are applied to the skin. The hydrohalide salts of para-alkoxybenzoyl scopolamine have a lower buffer capacity than do the hydroacetate salts for example and are therefore preferred from the standpoint of penetrability.

Two methods were used to test the effectiveness of the antiperspirant compositions of this invention and other compositions with which they were compared. These were the "forearm" method described supra, and the "axilla" method.

The axilla method involves direct measurement of the weight of perspiration secreted in the axilla. This is very significant, since the axilla is the area of most practical importance in the inhibition of perspiration. The axilla method uses a gravimetric measure of the amount of perspiration produced in the axilla to determine antiperspirant effect. One hour after application of the composition to be tested, the subjects were placed in a room at 100° F. which has a relative humidity of about 40–50%. After a "warmup" period of ½ hour, the axillae were washed and dried. Then tared Webrill pads for the collection of perspiration were placed in the axillae of each arm for 10 minutes after which another set of pads were placed in the axillae for 10 minutes. After a 20 minute interval the axillae were wiped dry and two more sets of pads were used for two 10 minute periods each. The procedure was repeated and additional collections are made by the same procedure for as long as desired. Each time the pads were removed from the axillae, they were placed in tared tightly covered jars and weighed to determine the amount of perspiration produced. In the course of the test, the perspiration collection 3 hours after application is a convenient and significant time for comparison purposes.

While the amounts of perspiration produced in the left and right axilla of a subject are usually not the same, a given subject will have a reasonably consistent ratio of output between the two sides. A normal ratio for a subject was established by making four or five control runs before any treatment was applied. When the antiperspirant composition to be tested was applied to one axilla (the other one being the control), the normal ratio was significantly altered. The reduction in sweating produced by the antiperspirant being tested was obtained by fitting the results from the axilla method into the following formula:

Percent reduction in sweating $$=100-\left(\frac{\text{Antiperspirant test ratio}}{\text{Average untreated ratio}}\right)\times 100$$

Example II

The antiperspirant efficacy of benzoyl and para-methoxybenzol esters of scopolamine hydrobromide was compared using the axilla method. One ml. of a 0.025% solution of the respective esters adjusted to pH 3.0 with HCl was applied to the axillary area of ten subjects. The following results were obtained:

| Material applied | Average percent Inhibition of Sweating Time after Application | |
|---|---|---|
| | 3 hours | 24 hours |
| Para-methoxybenzoyl scopolamine hydrobromide | 95 | 40 |
| Benzoyl scopolamine hydrobromide | 70 | 20 |

It can be seen that the antiperspirant activity of the para-methoxy substituted ester is more rapid in onset and is longer lasting than that of the art-disclosed unsubstituted benzoyl ester. Similar results are obtained with the other para-alkoxy substituted benzoyl scopolamine compounds of this invention or mixture of these compounds.

While the compositions of the present invention find their greatest utility as antiperspirants topically applied to the axillary areas of the body, it was found that they also have surprising utility for use on other parts of the body. For example, the compositions topically applied, substantially completely inhibited sweating of the palms of hands and soles of the feet. This aspect of the invention is useful for those people who are troubled with "clammy" hands or whose feet are cold because of dampness caused by sweating. Moreover, inhibition of sweating on the palms of the hands and the soles of the feet will provide relief for dermatitis which is aggravated by perspiration. Forehead sweating can also be successfully inhibited, as for example, in the case of surgeons or technicians who are under stress and who must use both hands. Amounts of para-alkoxybenzoyl scopolamine esters greater than at the 0.25% level can be used to control extreme sweating if done with care, as for example by a physician.

What is claimed is:
1. An anticholinergic compound having the structure:

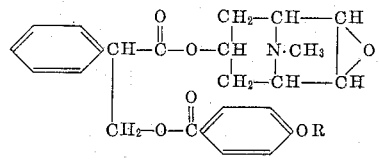

wherein R is an alkyl radical having not more than about 5 carbon atoms, and the acid salts thereof.
2. Para-methoxybenzoyl scopolamine hydrobromide.

References Cited by the Examiner
UNITED STATES PATENTS
2,814,623  11/1957  Moffet _____ 260—292

FOREIGN PATENTS
161,262  2/1955  Australia.
940,279  10/1963  Great Britain.

OTHER REFERENCES

Shelley et al.: "Comparative Study on the Effect of Anticholinergic Compounds on Sweating," J. Invest. Dermat. 16:267–274 (1951).

Moffett et al.: "Antispasmodics VIII. Scopolamine Derivatives," J. Am. Chem. Soc. 78 (14): 3448–3453, July 20, 1956.

Kilmer MacMillan et al.: "The Antiperspirant Action of Topically Applied Anticholinergics," J. Invest Dermat. 43 (5): 363–377, November 1964.

ELBERT L. ROBERTS, *Primary Examiner.*
S. K. ROSE, *Assistant Examiner.*